Dec. 15, 1936.   P. L. BELTON ET AL   2,064,143
RUBBER GLOVE AND PROCESS OF MAKING SAME
Filed Feb. 23, 1935
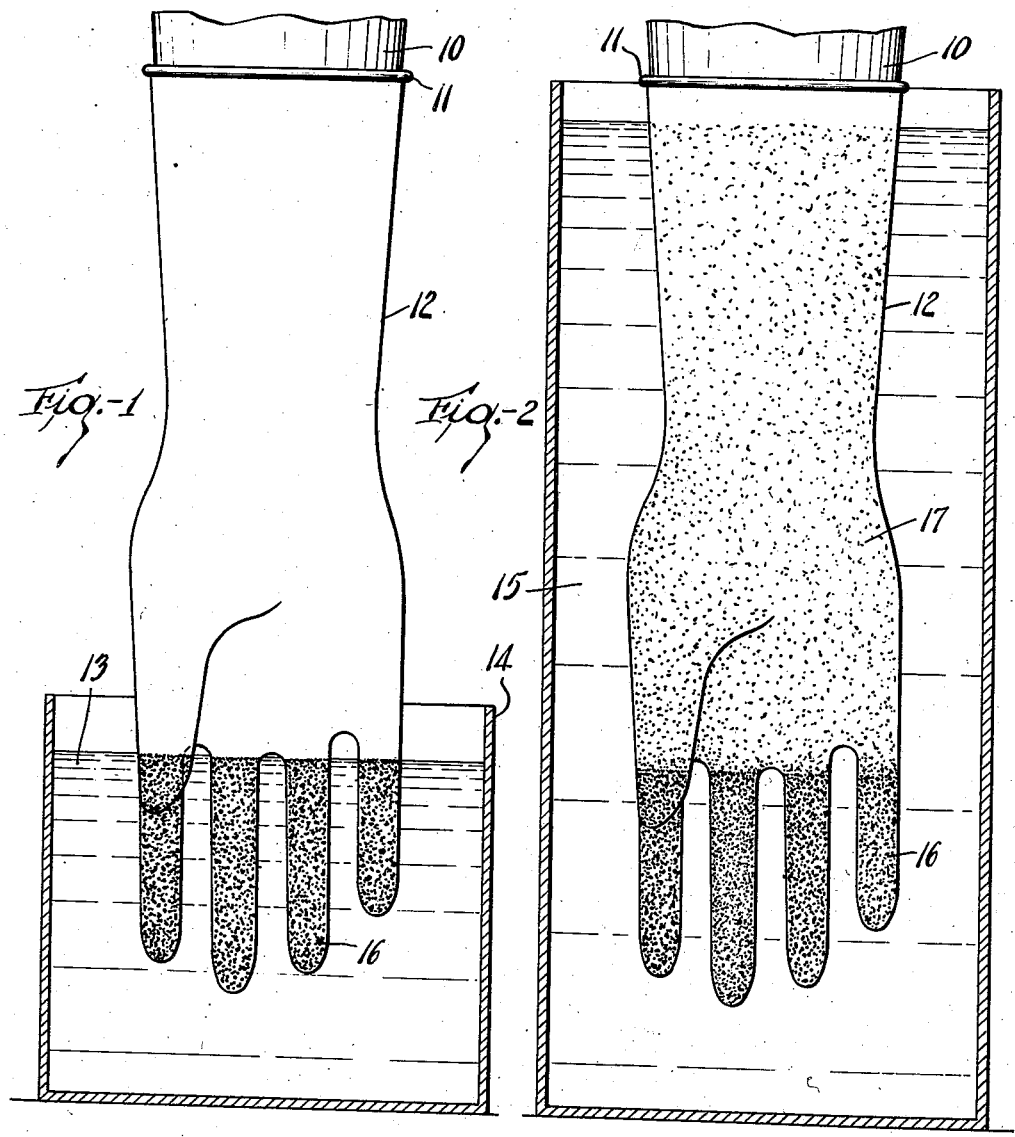
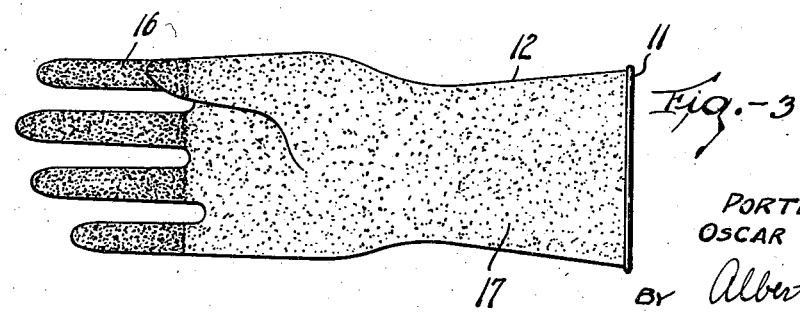
INVENTORS
PORTER LEE BELTON
OSCAR LEROY BELTON
BY Albert L. Ely
ATTORNEY Patented Dec. 15, 1936

2,064,143

UNITED STATES PATENT OFFICE 2,064,143

RUBBER GLOVE AND PROCESS OF MAKING SAME

Porter Lee Belton and Oscar Leroy Belton, Barberton, Ohio, assignors to Seiberling Latex Products Company, Akron, Ohio, a corporation of Ohio Application February 23, 1935, Serial No. 7,700

2 Claims. (Cl. 18—53)

This invention relates to an improvement in rubber gloves and the process of making the same wherein the outer surface of the glove is treated in such a manner as to provide pebbling or crinkling of different degrees of roughness on different portions thereof, such as the fingers and palm, it being desirable, in a glove of this type, to have the finger portion of greater roughness.

It is a further object of the invention to produce a so-called household rubber glove having the aforesaid pebbled or crinkled outer surface which is inexpensive to manufacture, of high grade and long life, and of pleasing appearance.

Heretofore so-called surgeon's gloves made from pure rubber have had substantially their entire outer surfaces pebbled or crinkled in the well-known manner, but this pebbling or crinkling while being produced in various roughnesses to suit the demand was of uniformity on each glove.

So far as we are aware, no rubber gloves have been heretofore produced according to this improved process wherein the outer surface of the glove is pebbled or crinkled in different degrees of roughness on different portions of the same glove.

With the objects above indicated and other objects hereinafter explained in view, the invention consists in the improved process of making rubber gloves and the resultant article.

Referring to the drawing,

Figure 1 is an illustration showing the first step in the pebbling operation;

Figure 2 is an illustration showing the final step in the pebbling operation;

Figure 3 is a front view of a glove made in accordance with the process embodying the present invention.

The process of producing a pebbled or crinkled surface will be described in connection with a rubber glove as illustrated in the accompanying drawing, although it should be understood that other articles may likewise be treated without departing from the invention.

In the manufacture of household gloves according to the present invention, a rubber cement is used in which the rubber stock and naphtha may be combined in any desired proportions, depending upon the quality desired in the ultimate glove, and may be mixed in a cement churn of well-known type.

Glove forms 10 are dipped into the rubber cement, removed and allowed to dry for a sufficient period of time, and this may be at room temperature. The forms 10 with the dip thereon are again dipped in the rubber cement and may be repeatedly dipped until the rubber deposit is of the desired gauge. Following each dipping operation, however, the deposited rubber cement on the forms should be permitted to dry sufficiently before the next dipping operation, and the time required for subsequent dryings varies depending upon atmospheric conditions.

After the gloves have had their final dipping and drying, the beads 11 are formed thereon in any well known manner, this generally being a hand operation.

The gloves on the forms 10 are next given a skin cure by placing the gloves in a vapor cupboard of well-known type for a suitable period of time, preferably from three to five minutes with the door of the cupboard closed and for an additional period preferably four to five minutes with the door open. This cupboard is so arranged that when the door is closed, the fumes from sulphur chloride are prevented from escaping, thus passing into contact with the gloves, but when the door is opened means is provided by which the fumes are removed. The cupboard is heated preferably with steam coils and maintained at a temperature preferably from 95° to 110° F. The desired quantity of sulphur chloride is placed in a receptacle deposited upon the steam coils to cause evaporation and circulate the fumes therefrom through the interior of the cupboard in contact with the gloves.

The length of time the gloves are subjected to the vapor cure determines approximately the thickness of the skin formed on the outside of the glove.

The skin cured gloves 12 still upon the forms 10 are next immersed, preferably fingers first, as shown in Figure 1, in a solution of naphtha 13, or other suitable swelling agent, contained in a suitable receptacle 14, any desirable distance but preferably until the top surface of the naphtha is slightly below the connecting portions between adjacent fingers. They remain in the naphtha from one to three minutes, the duration depending upon temperature conditions, solvent and thickness of skin cure on the gloves. The naphtha solution reacts upon the skin surface on the fingers and causes a pebbling or crinkling 16 to appear. The degree of pebbling or crinkling will vary with the time that the fingers are retained in the solution.

After the fingers of the glove have been so treated they are removed and allowed to dry for a period preferably from one to ten minutes, after which the glove 12 is entirely immersed, as shown in Figure 2, into a curing solution 15 containing preferably seven to ten ounces of sulphur chloride to five gallons of naphtha, for a period of approximately one hundred and fifty to one hundred and sixty seconds. This is termed a second cure. In this case, the pebbling or crinkling 17 produced upon the palm and wrist portions of the glove is of less degree of roughness than the pebbling 16 on the fingers, giving a two-tone or two-degree finish.

It is believed that this pebbling produced by the second cure occurs by reason of the action of naphtha on the skin cure which takes place before the curing action of the sulphur chloride or before the curing action of the sulphur chloride stops the swelling action of naphtha on the skin cure produced by vapor fumes of sulphur chloride.

After the gloves are removed from this solution they are permitted to dry from one to two hours depending upon drying conditions, and then dusted with soapstone and pumice and then stripped from the forms.

A different final cure may be employed wherein after the fingers have been first immersed in the naphtha solution they are removed and allowed to dry for about one minute and then the entire glove is immersed again in the naphtha solution up to the bead or wherever desired for approximately one minute and then removed. Or these steps may be reversed. The gloves are then given an acid cure or vapor cure as desired in any well-known manner.

The same pebbling effect may be obtained by applying a coating of any desired thickness of rubber material containing a vulcanizing agent such as sulphur and an accelerator such as the commercially known A 19 to a glove form of the type herein shown. The rubber coating is given a skin cure in a vapor cupboard with sulphur chloride for approximately four minutes in the manner heretofore described. It is then subjected to the action of a swelling agent preferably by immersing the finger portions in naphtha for one and one-half minutes and then the entire glove for one-half minute. The rubber structure may then be finally cured in open steam for twenty-five minutes at forty-five pounds pressure. It may also be cured in hot air or hot water.

While the process herein described relates to the production of a household rubber glove made by dipping a form into a rubber cement, it is not so limited and other rubber solutions may be employed as well as various other ways of coating the forms. Furthermore, surgeon's gloves made from so-called "pure rubber" may be pebbled in two-tone effects in one of the manners herefore described. It should also be understood that time and element changes made with respect to the aforesaid process will very likely require corresponding changes in other steps as to time, etc. While the preferred process is herein explained, I am not to be precisely limited thereto other than by the appended claims as equivalent steps may be utilized to obtain the same result.

What is claimed is:

1. The process of making rubber articles with pebbled or crinkled outer surfaces of different degrees of roughness which comprises partially vulcanizing the article to form a skin of rubber on the article, pebbling or crinkling a portion of the article by subjecting said portion thereof to the action of a swelling agent, and then simultaneously vulcanizing the complete article and pebbling or crinkling another portion of the article to a different degree than the first portion thereof by subjecting the entire article to the action of a combined vulcanizing and swelling agent.

2. The process of making a rubber glove with a pebbled or crinkled outer surface of different degrees of roughness which comprises partially vulcanizing the glove to form a skin of rubber thereon, pebbling or crinkling the finger portions of the glove by subjecting said portions to the action of a swelling agent, and then simultaneously vulcanizing the entire glove and pebbling or crinkling the rest of the glove to a lesser degree than the fingers by subjecting the entire glove to the action of a combined vulcanizing and swelling agent.

PORTER LEE BELTON.
OSCAR LEROY BELTON.